Oct. 8, 1963 A. L. VANDERGRIFF Re. 25,460

PROCESS AND APPARATUS FOR CLEANING AND CONDITIONING SEED COTTON

Original Filed Sept. 8, 1959

5 Sheets-Sheet 1

INVENTOR.
ARVEL L. VANDERGRIFF
BY
Jenning, Carter & Thompson
Attorneys

PROCESS AND APPARATUS FOR CLEANING AND CONDITIONING SEED COTTON

Original Filed Sept. 8, 1959 5 Sheets-Sheet 2

INVENTOR.
ARVEL L. VANDERGRIFF
BY
Jennings Carter & Thompson
Attorneys

PROCESS AND APPARATUS FOR CLEANING AND CONDITIONING SEED COTTON

Original Filed Sept. 8, 1959 5 Sheets-Sheet 3

INVENTOR.
ARVEL L. VANDERGRIFF
BY
Jennings Carter & Thompson
Attorneys

PROCESS AND APPARATUS FOR CLEANING AND CONDITIONING SEED COTTON

Original Filed Sept. 8, 1959 5 Sheets-Sheet 4

INVENTOR
ARVEL L. VANDERGRIFF
BY
Jennings Carter & Thompson
Attorneys

PROCESS AND APPARATUS FOR CLEANING AND CONDITIONING SEED COTTON

Original Filed Sept. 8, 1959 5 Sheets-Sheet 5

INVENTOR.
ARVEL L. VANDERGRIFF
BY
Jenning, Carter & Thompson
Attorneys

United States Patent Office

Re. 25,460

Reissued Oct. 8, 1963

25,460

PROCESS AND APPARATUS FOR CLEANING AND CONDITIONING SEED COTTON

Arvel L. Vandergriff, Columbus, Ga., by Lummus Cotton Gin Company, Columbus, Ga., a corporation of Georgia, assignee Original No. 3,069,730, dated Dec. 25, 1962, Ser. No. 838,697, Sept. 8, 1959. Application for reissue Mar. 18, 1963, Ser. No. 270,132

14 Claims. (Cl. 19—203)

This invention relates to a process and apparatus for cleaning and conditioning seed cotton for ginning and has for one of its objects the provision of a process and apparatus of the character designated which shall be effective to remove sticks, trash and other foreign material from freshly picked cotton and deliver it to the gin clean and with a predetermined moisture content ready for the most effective ginning operation.

A further object of my invention is to provide a process and apparatus which shall be effective to subject freshly picked damp trashy cotton to simultaneous cleaning, opening, drying and fluffing operations whereby excess moisture is removed, the trash is separated from the cotton, and the wadded cotton is opened and fluffed up into the most favorable condition for ginning.

Another object of my invention is to provide apparatus for cleaning and conditioning seed cotton which shall be effective to remove trash from cotton containing a minimum of moisture and which shall include means responsive to the humidity in the apparatus to supply moisture to the cotton whereby it is delivered from the apparatus with a predetermined moisture content.

A more specific object of my invention is to provide apparatus for cleaning and conditioning cotton which shall include a casing through which seed cotton is impelled along a restricted path by a high velocity stream of heated air and its direction of movement reversed at intervals, together with means to separate trash and other foreign material at certain points of reversal, and which shall contain other means to raise the cotton along its path of movement at intervals, whereby cotton which has been cleaned and opened up is removed from the apparatus by the stream of air ahead of the damper, denser masses of cotton, which tend to settle in the stream. My invention further contemplates the introduction into the casing a predetermined volume of heated air for propelling the cotton through the casing and a discharge of an equal volume of air with the cleaned, conditioned cotton, together with means to recirculate the heated air before it is discharged from the casing.

My invention contemplates the use of cleaning saw cylinders, brushes, and doffing saw cylinders for removing trash from the cotton, of the type disclosed and claimed in my co-pending application, Serial No. 775,935 filed November 24, 1958, and assigned to Lummus Cotton Gin Company, although, as will be apparent from a further reading of this specification, the arrangement and mode of operation is quite different.

Heretofore in preparing dirty, trashy seed cotton for ginning, especially damp cotton that has been harvested, it has been the custom to pass the cotton through two tower cotton driers with an extractor and cleaner interposed between the driers having from 12 to 14 cleaning saw cylinders. Following the second stage of drying there has been a second extractor and cleaner with from 12 to 14 cleaning saw cylinders.

In such apparatus it is necessary to reduce the moisture content of the cotton below normal in order to produce the fluffy condition necessary for efficient cleaning and good ginning. This over drying results in a considerable reduction in the spinning quality of the lint fibers. I have found that by subjecting the cotton to a drying, opening and cleaning operation simultaneously while it is being conveyed by a stream of heated air, with controlled humidity, the cotton may be better conditioned in a single piece of apparatus and be delivered to the gin comparatively clean and in the best condition for ginning.

Apparatus embodying features of my invention is illustrated in the accompanying drawings, forming a part of this application, in which—

Figure 1:
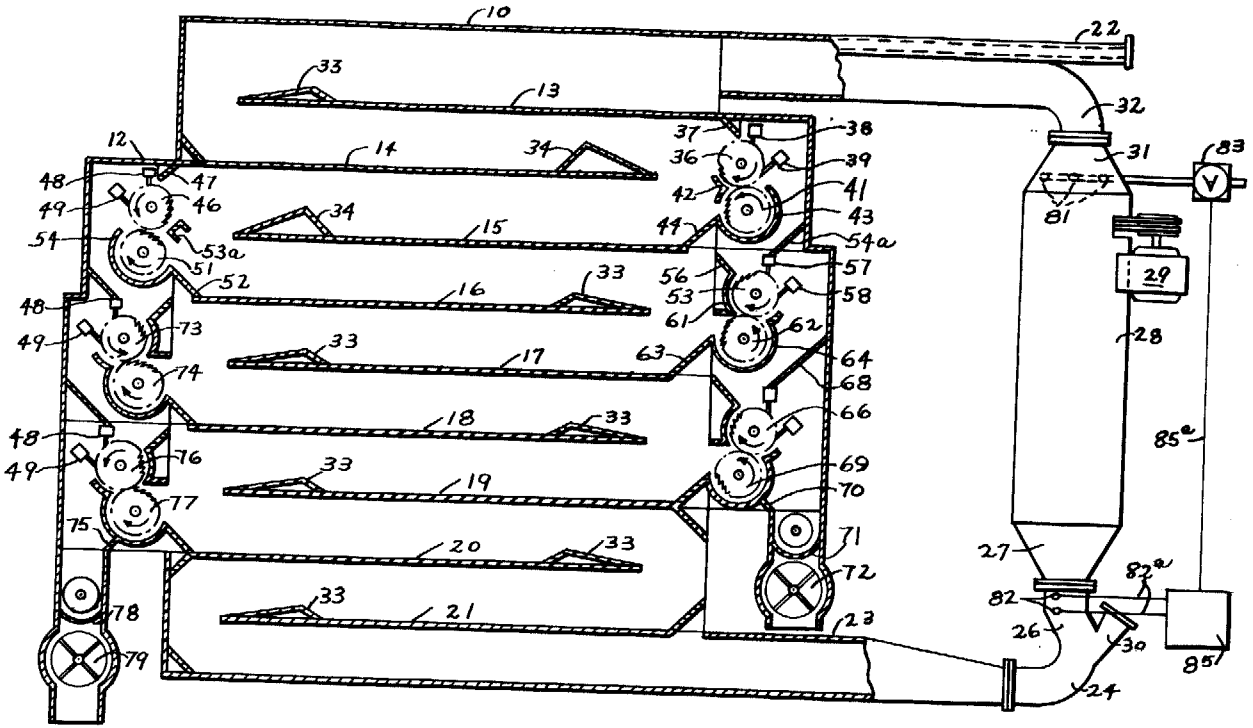
FIG. 1 is a vertical sectional view of the apparatus.
Figure 2:
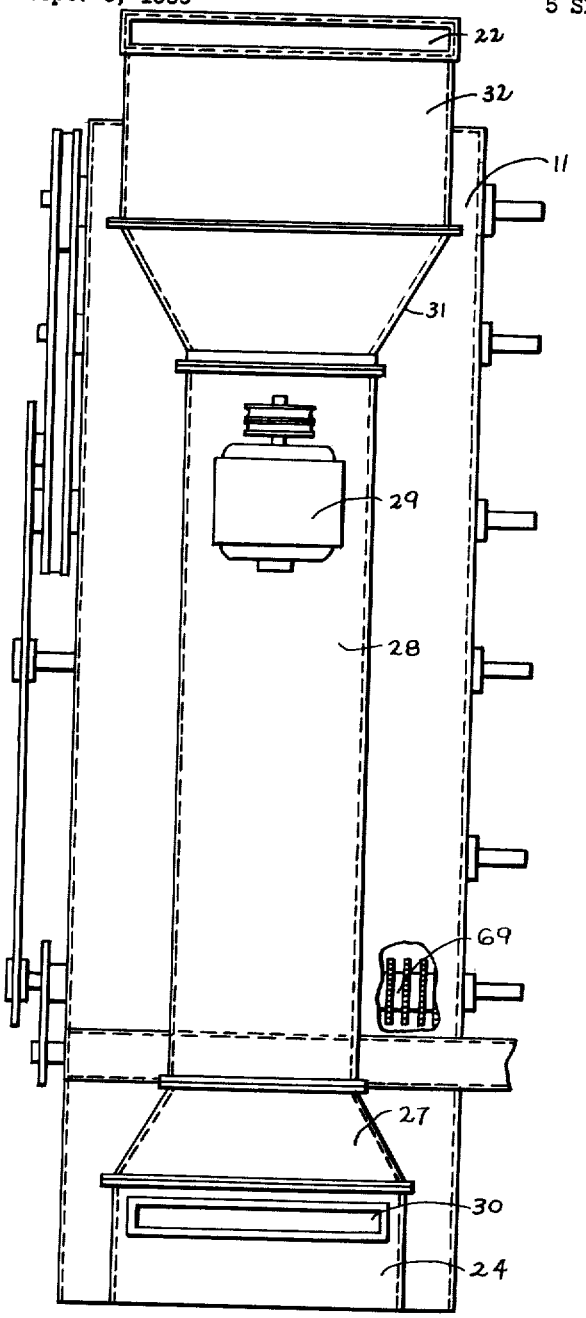
FIG. 2 is an end elevational view.

Referring to the drawings for a better understanding of my invention, I show in FIG. 1 a casing 10 which is relatively long, high and narrow. While obviously various sizes may be employed, I have used, by way of example, a casing 16 feet long, 20 feet high, and 6 feet wide, inside measurements. At the right hand end of the casing 10, as viewed in FIG. 1, is a cleaning unit housing 11, and at the left hand end a similar cleaning unit housing 12. The cleaning unit housings 11 and 12 communicate with the interior of the casing 10 and have mounted therein cleaning units which operate in a manner to be described in detail hereinafter.

The interior of the casing 10 is divided by a plurality of shelves or partitions numbered from 13 to 21, inclusive, as shown in the drawing, which are equidistantly spaced vertically and extend horizontally lengthwise of the casing. The shelves 13, 15, 17, 19, and 21 each extends from the right hand end of the casing and terminates short of the left hand end. The shelves 14, 16, 18 and 20 extend from the left hand end of the casing and terminate short of the right hand end. The spaces between the free ends of the shelves and the adjacent end of the casing is in each instance approximately equal to the space between adjacent shelves. There is thus formed a continuous restricted zig-zag passage from top to bottom of the casing with a reversal of direction at the delivery end of each shelf. Seed cotton, impelled by a high velocity current of heated air is admitted to the casing by an inlet conduit 22 into the passage, above the uppermost shelf 13, and is discharged from the passage beneath the lowest shelf 21 by means of a conduit 23. The conduit 23, as shown in the drawing, terminates in a constricted, elbow-like upturned portion 24.

Connected to the upturned portion 24 of the conduit 23 is a conduit 26, which in turn is connected by means of a transition 27 to the casing 28 of an axial fan, driven by a motor 29. The cotton being heavier than the conveying air is thrown against the outward, upwardly curved wall and, together with a portion of the conveying air, passes out through a branch outlet conduit 30.

The fan 28 is connected by means of a transition 31 and a conduit 32 to the uppermost passage in the casing above the shelf 13. It will be understood that the conduits 22, 23 and 32 are all preferably of a width equal to that of the casing 10. There is thus provided, by the arrangement described, a continuous recirculation of heated air through the casing 10.

Adjacent the free, or delivery end of each of the shelves 13, 16, 17, 18, 19, 20 and 21 is a ramp-like upward projection 33 which contracts the passage formed by the shelf and causes the cotton to be pitched upward as it moves over the ramp, or projection. Adjacent the free end of each of the shelves 14 and 15 is a ramp-like upward projection 34 which is more pronounced than the projections 33 for a purpose which will become apparent. The projections 34 may incline upwardly at their receiving ends at angles of approximately 45° while the remaining ramp-like projections 33 incline upwardly at approximately 30°. These ramp-like projections 33 and 34 are very important in that the steeper projections 34 serve to deliver the seed cotton to be cleaned to the cleaning cylinders, to be described later, and they also serve to separate the fluffed locks of seed cotton from the mass as it is pitched upward. Once these locks of cotton are dried sufficiently to be fluffed, they are separated from the mass and do not join it but are conveyed rapidly by the high velocity air stream to the outlet 30. The cotton which is not dried sufficiently to fluff forms a rather dense mass along the surface of the shelves and moves at a slower rate than the air stream. This process is repeated at the end of each shelf so that all the cotton is dried sufficiently to reach a fluffed condition and move at approximately the velocity of the conveying air stream.

Mounted in the cleaning unit 11, at the end of the portion of the passage defined by the shelves 13 and 14, is a cleaning saw cylinder 36 which is driven by any suitable means in the direction shown by the arrow. The cotton is tossed upwardly by passage over the projection 34 onto the upgoing side of the saw cylinder 36 and is guided onto the saw cylinder by a deflector plate 37. The cotton is carried around by the saw cylinder and passes first under a resilient wire brush 38 such as described in my before mentioned, previously filed, application. The brush 38 is mounted over the upper, downgoing quadrant of the saw cylinder and presses the cotton into the teeth of the saw cylinder and permits the sticks, burrs and other trash together with some cotton clinging thereto to be thrown off the saw cylinder by centrifugal force, whilst the cotton is being carried around. A second resilient wire brush 39 is mounted adjacent the down going side of the saw cylinder 36 approximately level with the center of the saw cylinder. This brush also presses the cotton into the teeth of the saw cylinder 36 and serves to aid in retaining the cotton on the saw cylinder. In its further travel on the saw cylinder, still more trash is thrown off by centrifugal force.

Mounted beneath the cleaning saw cylinder 36 and rotating in an opposite direction, as indicated by the arrow, is a doffing saw cylinder 41. The doffing cylinder removes the cotton from the cleaning cylinder 36 and delivers it into the passage defined by the shelves 14 and 15. A guide plate 42 aids in removing cotton from the saw cylinder 36. The doffing saw cylinder 41 is provided with a cover 43 on its side remote from the casing 10 which prevents any cotton from being thrown off except into the passage between the shelves 14 and 15. The cotton is directed into this passage by a guide plate 44.

The partially cleaned cotton next moves to the left, as viewed in the drawing, over the shelf 15, and in passing over the projection 34 on the shelf 15 is tossed upwardly onto the upgoing side of a cleaning saw cylinder 46, mounted in the cleaning unit housing 12, which is being rotated in the direction shown by the arrow. The cotton is guided onto the saw cylinder 46 by means of a guide plate 47, mounted over the saw cylinder. Cooperating with the downgoing side of the saw cylinder 46, to hold the cotton thereon, are a pair of resilient wire brushes 48 and 49 which are mounted in positions corresponding to those of the brushes 38 and 39 which cooperate with the saw cylinder 36. The brushes press the cotton into the teeth of the saw cylinder 46 while permitting sticks, burrs and other remaining trash together with some cotton to be thrown off by centrifugal force. Mounted beneath the cleaning saw cylinder 46 is a doffing cylinder 51 which is rotated in the direction shown by the arrow to remove cotton from the cleaning saw cylinder 46 and deliver it into the passage between the shelves 15 and 16, the cotton being guided onto the shelf 16 by a plate 52. A guide plate 53a aids in removing cotton from the saw cylinder 46. The doffing cylinder 51 is provided with a cover 54 which extends around the rear of the saw cylinder and prevents cotton from being thrown off the cylinder except forwardly into the passage over the shelf 16.

The cotton delivered by the doffing cylinder 51 onto the shelf 16 continues its travel through the casing, being impelled by the high velocity stream of heated air. As will be seen, its direction of movement is reversed at the free end of each of the shelves 16 to 21, inclusive, and it is tossed upwardly at the end of each shelf by the upward projection 33. It is thus thoroughly opened to that the heat may accomplish its purpose of fluffing and bleaching. If the cotton contained excessive moisture when it entered the casing the excess moisture is removed by action of the heated air. The dried, opened and fluffed cotton, tossed upwardly by the projections 33 remains in suspension in the conveying air and moves with the air stream to the outlet 30 ahead of the remaining cotton. The moist portion of the cotton settles lower on the shelves and remains in the casing for a longer period of time. After passing over the shelf 21 the direction of movement of the cotton is reversed and it is discharged through the conduit 23. The cotton being heavier than the conveying air, it hugs the lower, upwardly curved wall of the conduit section 24 so that it is not drawn upwardly into the fan casing 28 but passes out through the branch outlet 30.

The cotton clinging to the sticks, burrs and other trash thrown off from the cleaning saw cylinder 36, falls downwardly in the housing 11 onto a cleaning saw cylinder 53, being guided thereto by means of deflector plates 54a and 56. The saw cylinder 53 is being rotated by any suitable means, in the direction shown by the arrow. Resilient wire brushes 57 and 58 are mounted adjacent the saw cylinder 53 in the same positions relative thereto as the brushes 38 and 39 with respect to the saw cylinder 36. The brushes serve to press the cotton into the teeth of the saw cylinder 53 and permit heavier trash to be thrown off by centrifugal force. A shield 61 mounted between the saw cylinder 53 and the casing 10 prevents any trash or cotton thrown off by the saw cylinder 36 from entering the casing 10.

Mounted beneath the cleaning saw cylinder 53 and cooperating therewith is a doffing saw cylinder 62 which rotates in the direction shown by the arrow and serves to remove cotton from the saw cylinder 53 and deliver it into the casing 10 in the passage between the shelves 16 and 17 where it rejoins the main stream of cotton passing through the casing. A plate 63 serves to guide the cotton into the passage. A cover 64 is provided over the side of the saw cylinder 62 remote from the casing 10, which serves to prevent the doffing cylinder 62 from throwing off cotton except into the passage between the shelves 16 and 17. Trash together with a small remaining quantity of cotton thrown off from the cleaning saw cylinder 53 falls downwardly in the casing 11 onto a cleaning saw cylinder 66 being guided thereto by inclined deflector plates 67 and 68. Beneath the cleaning saw cylinder 66 is mounted a doffing cylinder 69 which removes cotton separated from the trash and delivers into the passage between the shelves 18 and 19. The saw cylinders 66 and 69 are mounted in the casing 11 and operate in a manner identical to the saw cylinders 53 and 62.

The trash and other foreign material that is thrown off from the saw cylinders 36, 53 and 66 falls downwardly in the casing 11 into a conveyer trough 71 being guided thereto by means of a guide plate 70 and is discharged from the casing by means of an air sealed feeder 72.

At the opposite end of the apparatus from that just described, within the cleaning unit casing 12, are mounted cleaning saw cylinders 73 and 76 and doffing saw cylinder 74 and 77 all of which are rotated in the directions shown by the arrows and which are identical in arrangement, design and function to the cleaning saw cylinders 53 and 66, already described. They serve to separate cotton from the trash thrown off by the cleaning saw cylinder 46. The doffing cylinder 74 delivers cotton into the passage between the shelves 17 and 18, and the doffing cylinder 77 delivers cotton into the passage between the shelves 19 and 20. Trash which is finally thrown off from the cleaning saw cylinder 76 falls into a conveyer trough 78, being guided thereto by a plate 75, and is discharged from the casing by means of an air sealed feeder 79.

As before stated, it is contemplated that, by means of my invention, the seed cotton is delivered from the apparatus ready for ginning with a predetermined moisture content which has been found preferable for best results. During its passage through the apparatus the cotton, being subjected to the action of the heated air and a tossing action, is opened up and excess moisture removed. In case however the cotton enters the apparatus with a moisture content lower than is required for best ginning results, I provide means for adding moisture to the cotton. At 81 I show spray nozzles positioned to discharge water into the recirculating air stream at the transition 31. The spray nozzles 81 are controlled by a valve 83 which, in turn, is opened and closed responsive to the humidity in the recirculating air as determined by a humidity responsive device 82 mounted at any convenient point, as in the conduit section 26 ahead of the transition 27. The humidity responsive devices are connected to a controller 85 of well known design by wires **82*a* and the controller is connected to the valve 83 by a control line 85*a***. These devices are all well known in the art and form no part of my invention except in the combination and arrangement herein described.

Figure 3:
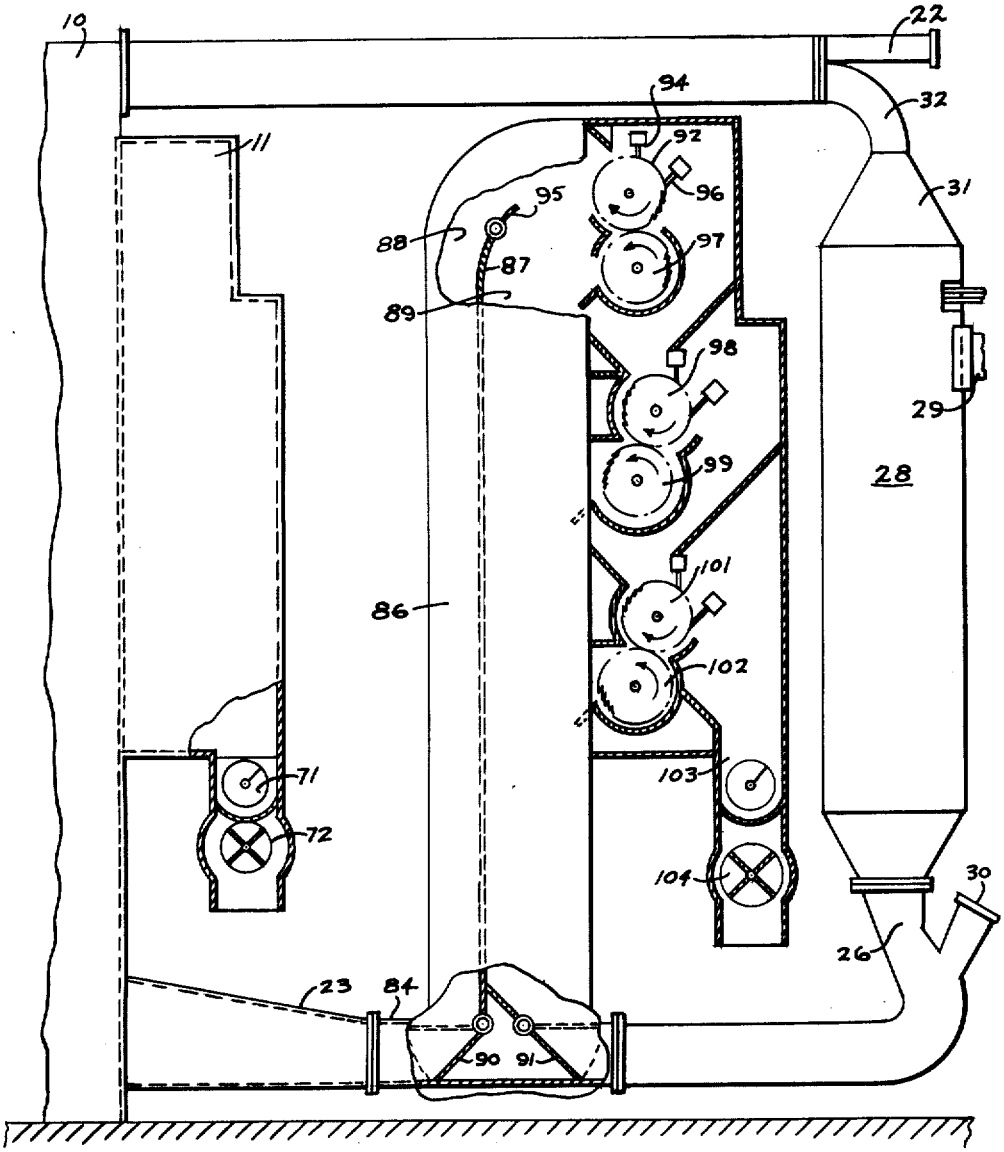
FIG. 3 is a partial sectional view, similar to FIG. 1, showing the apparatus with an additional cleaning unit.

Referring now to FIG. 3 of the drawings, I show a modified form of my improved apparatus which is particularly adapted for cleaning and conditioning cotton which contains an excessive amount of sticks, dirt and other trash. In the drawing, I show a fragment of the casing 10 and cleaning unit housing 11 already described. At 84 I show a conduit section which is connected to the outlet conduit 23 of the casing 10. Mounted on the conduit section 84 is a cleaning unit casing 86 which is divided along one side by a vertical partition 87 forming an upgoing passage 88 and a downgoing passage 89 within the casing, which passages connect with each other at their upper ends and both of which may be put in communication with the conduit section 84. A vane 90 pivotally mounted in the conduit section 84 may be turned to the position shown in FIG. 3 to divert cotton and air being discharged from the casing 10 upwardly through the passage 88 and a vane 91, also pivotally mounted in the conduit section 84, may be turned to the position shown in full line to deliver cotton and air from the downgoing passage 89 into the conduit section 84. When the vanes 90 and 91 are raised to their upper, dotted line positions, as viewed in the drawing, the airborne stream of cotton and air moves on through the conduit section to be discharged at 30, as already described.

The cleaning unit employed with this modification of my invention is of a design, construction and operation similar to cleaning units already described, and a description of all the details of construction will not be repeated. Mounted in the upper end of the casing 86, opposite the upper end of the passage 88, is a cleaning saw cylinder 92, similar to the saw cylinders 36 and 46, already described, rotating in the direction indicated by the arrow. When the cleaning section is in operation, cotton impelled by the stream of air in the passage 88 is delivered onto the upgoing side of the saw cylinder 92 to be carried around thereby. A vane 95, pivotally mounted on the upper end of the partition 87 provides means for varying the trajectory of the cotton delivered to the saw cylinder. It will be understood that the cotton, being heavier than the air by which it is conveyed, is delivered to the saw cylinder, while the conveying air reverses its direction of flow and flows downwardly through the downgoing passage 89. Wire brushes 94 and 96 press the cotton into the teeth of the saws and permit the heavier trash and dirt to be thrown off by centrifugal force. The cotton is doffed from the saw cylinder 92 by a doffing cylinder 97 and is discharged into the downgoing passage 89 to rejoin the main stream of air borne cotton. Dirt and trash together with some cotton thrown off from the saw cylinder 92 falls downwardly onto a cleaning saw cylinder 98 mounted in the casing 86 in the same manner and operating in the same manner as the cleaning saw cylinders 53 and 66 already described. Cotton is doffed from the saw cylinder 98 by a doffing cylinder 99 which discharges it into the downgoing passage 89. Dirt and trash together with some cotton thrown off by the saw cylinder 98 falls downwardly in a manner already described onto a third cleaning saw cylinder 101 where the remaining cotton is separated from the trash. The cotton is doffed from the saw cylinder 101 by a doffing cylinder 102 and is discharged into the downgoing passage 89 where it rejoins the main air borne stream of cotton which is discharged from the apparatus at 30. The trash and other foreign material thrown off from the saw cylinder 101 falls into a conveyer trough 103 from which it is discharged by an air sealed feeder 104.

Figure 4:
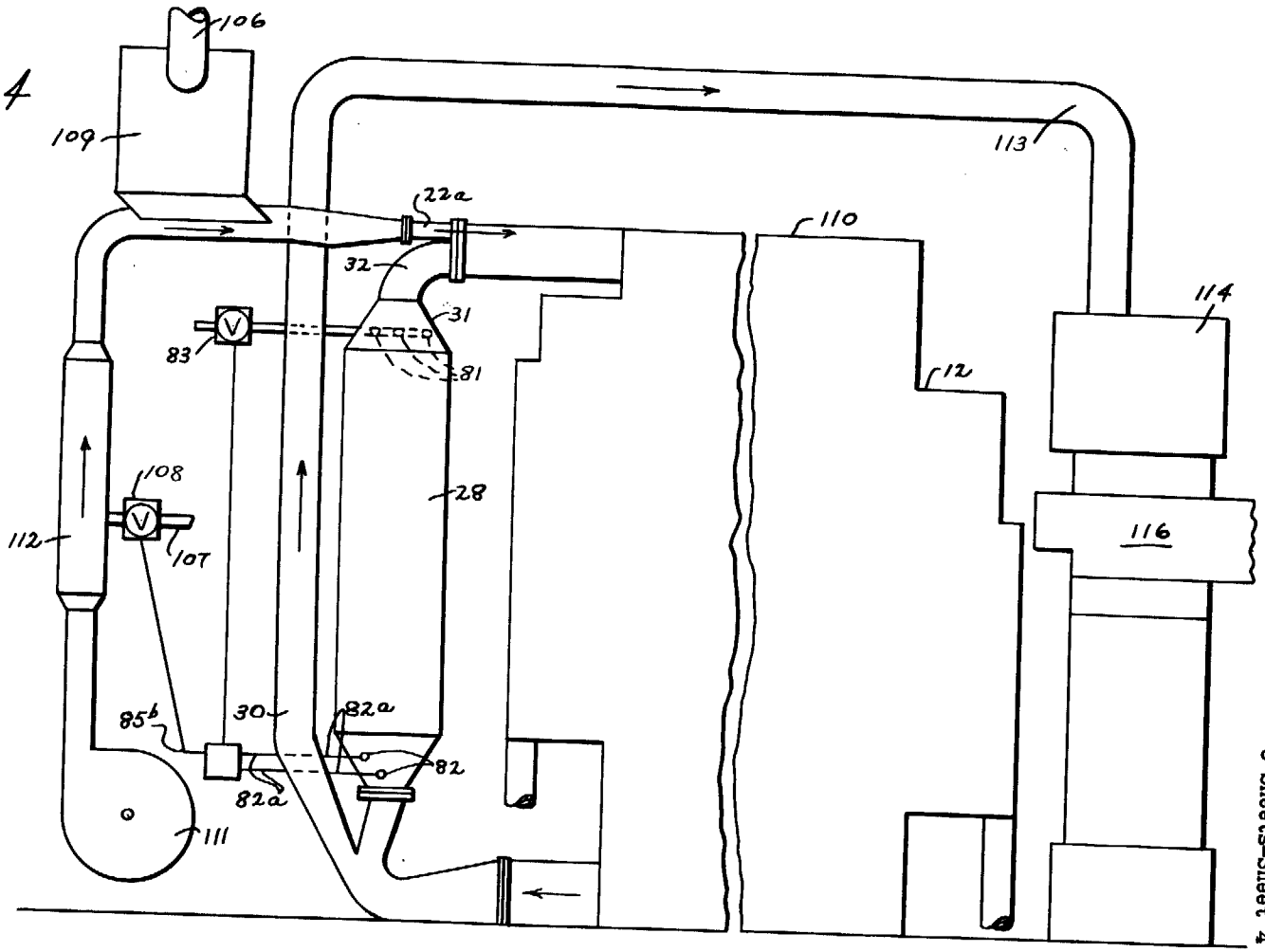
FIG. 4 is a schematic drawing showing my improved apparatus installed in a gin house.

From the foregoing description, the operation of my improved apparatus and the carrying out of my improved method will become readily apparent. Referring to FIG. 4 of the drawings, I show schematically, by way of example, the cotton cleaner and conditioner in association with other apparatus in a gin house. Cotton to be ginned is withdrawn from a source supply 106, and passes to a separator 109 which discharges it into the inlet conduit **22*a* of the cleaner and conditioner 110. At 111 I show a blower which discharges air into a heater 112 which, in turn, is connected to the inlet 22*a* of the cleaner and conditioner 110. The air is heated to a temperature of from 210° to 350° F. depending upon the moisture content of the cotton and is discharged into the inlet 22*a* at a velocity of around 2000 ft. per minute to impel the cotton through the conditioner casing. With a conditioner casing 16 feet by 20 feet by 6 feet inside measurement, and with an inlet 6 feet by 6 inches, I thus supply approximately 6000 cubic feet of heated air per minute to the apparatus. The same amount of air is withdrawn from the casing per minute at the outlet 30** so that there is no build up of moist air in the casing.

The heated air loosens the trash in the cotton and renders it easier to remove. It also serves to bleach the cotton and give it a better color. That portion of the cotton which is dry as it passes over the shelves in the casing 10 and is tossed upwards by the projections on the shelves, as heretofore described, remains in the air stream, off the shelves, and passes directly out of the casing, leaving the damp, heavier cotton behind subject to the action of the heated air. Thus the cotton discharged from the outlet 30 is of a uniform moisture content. The recirculating fan 28 recirculates approximately 20,000 cubic feet of air per minute through the apparatus to maintain the maximum velocity and turbulence in the casing.

If the cotton contains insufficient moisture for best results in ginning when delivered to the cleaner, it is still important that it be heated in order to loosen the dirt and trash and make it easier to clean. As before pointed out, under such conditions, moisture is added to the cotton automatically responsive to the humidity in the recirculating air. The temperature of the air at the outlet 26 from the casing is maintained at approximately 160° F. I have found that by controlling the humidity in the circulating air and by controlling the temperature of the impelling stream of air at the inlet **22*a***, so that the outlet temperature is approximately 160° F., the cotton will be discharged from the apparatus clean and with the optimum moisture content for ginning.

The cotton and heated air discharged from the outlet 30 passes through a conduit 113 to a separator 114 where the heated air is separated from the cotton and the cotton is delivered to a distributor 116 which delivers it to a feeder 117 and thence to a battery of gins 118.

While I have described the construction and operation of my improved apparatus as a combined drier, cleaner and conditioner for seed cotton, there are certain cotton growing areas where the cotton is harvested by hand and there is not the necessity for extensive seed cotton cleaning. In such areas I may furnish my improved apparatus without the cleaner casings 11 and 12 and without the cleaning elements. In such event the cotton passes through the casing 10, over the shelves and ramp-like projections in the manner described, being impelled by the stream of heated air at a controlled humidity.

Figure 5:
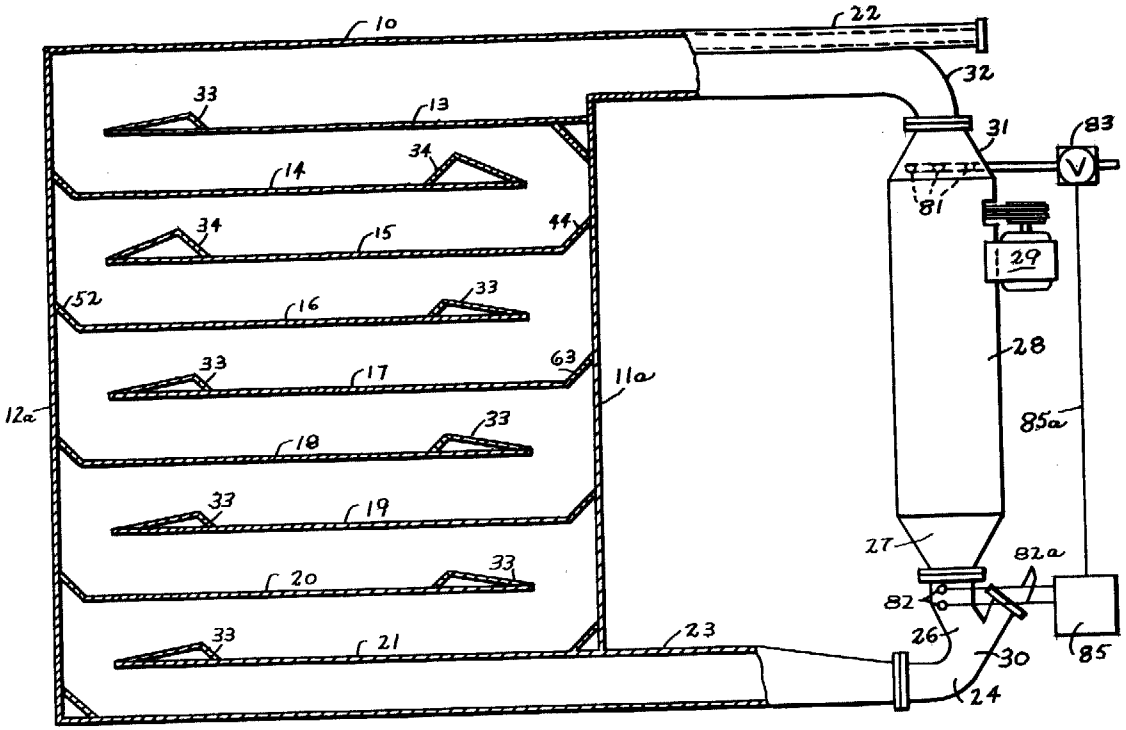
FIG. 5 is a sectional view similar to FIG. 1 showing a modified form of my invention.

Referring to FIGURE 5 of the drawing, I show such an apparatus which is in all respects similar to that shown in FIGURE 1, except that the cleaner casings 11 and 12, with their cleaning elements, are removed and are replaced by end walls **11*a* and 12*a***. The other elements of the apparatus are the same as shown in FIGURE 1 and are indicated by the same reference numerals.

In the apparatus shown in FIGURE 5 the stream of heated air and cotton enters the apparatus through the conduit 22 and passes back and forth over the shelves 13 to 21 inclusive, the cotton being tossed upwardly into the stream as it approaches the end of each of the shelves. As the stream of air and cotton leaves the casing 10 through the conduit 23 and reaches the elbow-like upturned portion 24, the cotton is carried by centrifugal force along the outer wall of said upturned portion, while the recirculating fan 28 withdraws air from the stream, as previously described, and discharges it through the transition 31 and conduit 32 into the casing 10, along with the heated air and cotton entering through the conduit 22. The humidity of the air entering the casing 10 is controlled as previously described, so that the cotton is discharged from the apparatus through the conduit 113, as previously described, in an open, fluffed, condition with a uniform moisture content.

Cotton thus treated is delivered from the apparatus in an opened, fluffy condition, with a uniform moisture content, best suited for ginning. It is thus to be understood that I do not limit myself strictly to apparatus including cleaning elements, as my invention contemplates the drying and conditioning of cotton, broadly.

It will be understood that the dimensions of the apparatus, the quantities of heated air employed, and the velocities thereof are given for the purpose of illustration and not by way of limitation, as apparatus of different dimensions and varying volumes of heated air may be employed. Also while I have shown no specific means for driving the various rotating parts, such means are well understood and widely used in the art. Therefore, a detailed showing and description thereof has been omitted for the sake of clarity.

As many apparently widely different embodiments of this invention may be made without departing from the spirit and scope thereof, it is to be understood that the invention is not limited to the specific embodiments thereof except as defined in the appended claims.

What I claim is:

1. The method of conditioning seed cotton for ginning which comprises impelling the cotton along a restricted path from a higher to a lower level by means of a high velocity stream of heated air, introducing fresh heated air and cotton to be conditioned into the impelling stream at the higher level, separating part of the air from the impelling stream at the lower level in volume equal to that introduced at the higher level, separating cotton from the impelling stream along with said air being separated therefrom, after separation of the cotton imparting an impelling force to the remaining portion of the impelling stream to recirculate it through said path, and controlling the moisture content of the conditioned cotton responsive to the humidity in the impelling stream of heated air.

2. The method defined in claim 1 in which the impelling stream of air at the entrance to said restricted path is heated to a temperature of from 210° F. to 350° F. and is maintained at a temperature of approximately 160° F. at the exit from said path.

3. The method of cleaning and conditioning seed cotton for ginning as defined in claim 1 in which the cotton is impelled along a restricted path by means of air heated to a temperature of from 210° to 350° F. and at a velocity of around 2000 feet per minute, agitating the cotton in the course of its movement, reversing its direction of movement at intervals, and separating trash and other foreign material from the cotton adjacent points of reversal of direction of movement.

4. The method of cleaning and conditioning seed cotton for ginning as defined in claim 1 in which cotton is impelled along superposed horizontal restricted paths from a higher to a lower elevation by means of a stream of air at a velocity at least 2000 feet per minute and heated to a temperature of from 210° to 350° F., reversing the direction of movement of the stream at the end of each path, imparting a lifting movement to the stream of air and cotton adjacent the end of each path, separating trash and other foreign material from the cotton adjacent points of reversal of direction of movement of the stream, and controlling the moisture content of the cotton responsive to the humidity in the impelling stream of heated air.

5. In apparatus for cleaning and conditioning seed cotton for ginning, a relatively narrow vertically disposed elongated casing, a plurality of horizontally disposed equidistantly spaced shelves mounted in the casing, said shelves from the uppermost to the lowest terminating alternately in spaced relation to the opposite ends of the casing thereby forming a continuous restricted zig-zag path from the upper end of the casing to the lower, reversing direction alternately at opposite ends of the casing, an inlet at the upper end of the casing to admit a stream of heated air and cotton into the upper end of said zig-zag path, an outlet at the lower end of said casing communicating with the lower end of said path, a rotary cleaning saw cylinder mounted adjacent a point of reversal of the path in position to receive cotton passing through the said path, brush means coacting with the cleaning saw cylinder to press the cotton against the saw cylinder and permit trash to be thrown off therefrom by centrifugal force, a doffing cylinder mounted beneath the cleaning saw cylinder to remove cotton therefrom and deliver it into a lower portion of said path, and means to remove the trash thrown off from the cleaning saw cylinder from the casing.

6. Apparatus as defined in claim 5 in which there are mounted in series below the said cleaning saw cylinder other cleaning saw cylinders, each having a doffing cylinder cooperating therewith, said other cleaning saw cylinders being constructed and arranged to receive the trash and foreign material thrown off from the first mentioned cleaning saw cylinder and separate cotton therefrom, and said other doffing cylinders being constructed and arranged to remove cotton from said other saw cylinders and deliver it into lower portions of said restricted path.

7. Apparatus as defined in claim 6 in which another cleaning saw cylinder is mounted at the opposite end of the casing adjacent a point of reversal of said path in position to receive cotton passing through said path and remove sticks and trash therefrom, together with a doffing cylinder for said last mentioned cleaning saw cylinder to remove cotton therefrom and return it to a lower portion of said path, and in which other cleaning saw cylinders and doffing cylinders are mounted below the first mentioned saw cylinder to separate cotton from the sticks and trash thrown off from the first mentioned saw cylinder and return it to a lower portion of said zig-zag path.

8. Apparatus for cleaning and conditioning seed cotton for ginning comprising, in combination, a vertically disposed elongated casing having an inlet for heated air and cotton adjacent the top and an air and cotton outlet adjacent the bottom, a plurality of equally spaced horizontal shelves mounted in the casing, said shelves from the upper portion of said casing to the lower portion thereof commencing alternately from opposite sides of the casing and each terminating short of the side opposite its commencement, thereby defining a continuous restricted zig-zag path from the upper end of the casing to the lower, the heated air and cotton being admitted into the upper end of said path, an outlet in the lower end of the casing to discharge cotton and air from the lower end of said path, a ramp-like upward projection adjacent the terminus of each of the shelves, a cleaning unit housing mounted on an end of the said casing and communicating therewith, a rotary cleaning saw cylinder mounted in the upper end of said housing in position to receive on its upgoing side cotton passing through said path to carry it around on said saw cylinder, a pair of resilient brushes mounted adjacent the downgoing side of the saw cylinder to press cotton into the teeth of the saw cylinder and permit trash with some cotton clinging thereto to be thrown off by centrifugal force, a doffing cylinder mounted beneath the cleaning saw cylinder to remove cotton from the cleaning saw cylinder and return it to a lower portion of the said zig-zag path, other cleaning saw cylinders mounted in said housing below the first mentioned cleaning saw cylinder, each having a doffing cylinder associated therewith, said other cleaning saw cylinders and doffing cylinders being constructed and arranged to separate cotton from the trash thrown off from the first mentioned cleaning saw cylinder and return it to said zig-zag path, and means to remove trash from the said housing thrown off by the cleaning saw cylinders and doffing cylinders.

9. Apparatus as defined in claim 8 including a separate passageway connecting the inlet and the outlet to said casing, and a blower interposed in said passageway to recirculate air in the casing.

10. Apparatus as defined in claim 8 in which the first mentioned cleaning saw cylinder is mounted in the housing opposite one of the ramp-like upward projections.

11. Apparatus as defined in claim 8 in which a second cleaning unit housing is mounted at the opposite end of the casing from the first mentioned housing, a second cleaning saw cylinder is mounted in the upper end of said second housing opposite one of the ramp-like upward projections in position to receive on its upgoing side cotton passing through said zig-zag path and carry it around thereon, a pair of resilient brushes cooperating with the downgoing side of said second cleaning saw cylinder to press cotton into the teeth of the saw and permit trash with some cotton clinging thereto to be thrown off by centrifugal force, a doffing cylinder mounted beneath the said second cleaning saw cylinder to remove cotton therefrom and return it to a lower portion of said zig-zag path, other cleaning saw cylinders mounted in said second housing below said second cleaning saw cylinder, each having a doffing cylinder associated therewith, said other cleaning saw cylinders and doffing cylinders being constructed and arranged to separate cotton from the trash thrown off from said second cleaning saw cylinder and return it to the said zig-zag path, and means to remove trash from said second housing after passing said other saw cylinders and said doffing cylinders.

12. Apparatus as defined in claim 8 including means to separate a portion of the heated air together with the conditioned cotton at the lower end of said zig-zag path, means to recirculate the remaining portion of said heated air through said zig-zag path, and means operative responsive to the moisture in said recirculating air to control the admission of sprays of water thereinto.

13. Apparatus for cleaning and conditioning seed cotton for ginning comprising, in combination, a vertically disposed elongated casing having an inlet for an airborne stream of cotton adjacent the top and an air and cotton outlet adjacent the bottom, a plurality of equally spaced horizontal shelves mounted in the casing, said shelves from the upper portion of said casing to the lower portion thereof commencing alternately from opposite sides of the casing and each terminating short of the side opposite its commencement thereby defining a series of horizontal passages forming in effect a continuous zig-zag path from the upper inlet end of the casing to the lower outlet end thereof, a cleaning unit housing mounted on one end of said casing and communicating therewith, said housing forming a passage for dirt and trash on its sides remote from the casing, a rotary cleaning saw cylinder mounted in the upper end of said housing adjacent said casing, means to deliver seed cotton from said zig-zag path to the upgoing side of said cleaning saw cylinder to be carried around thereby, a pair of resilient brushes mounted adjacent the downgoing side of the cleaning saw cylinder to press cotton into the teeth of the saw cylinder and permit dirt and trash with some cotton clinging thereto to be thrown off by centrifugal force into the passage for dirt and trash, a doffing cylinder mounted below said cleaning saw cylinder in position to remove cotton therefrom and return it to said zig-zag path, other cleaning saw cylinders mounted in said housing in series below the first mentioned cleaning saw cylinder, a doffing cylinder associated with each of said other cleaning saw cylinders arranged to remove cotton therefrom and deliver it into said zig-zag path, deflector plates to direct dirt and trash thrown off by each of the cleaning saw cylinders onto the next lower cleaning saw cylinder in the series, a cover for each of said doffing cylinders on its side remote from said zig-zag path whereby the cotton separated from the trash is delivered into said zig-zag path away from the passage for dirt and trash, and an outlet for dirt and trash in the lower end of the housing.

14. Apparatus for conditioning seed cotton for ginning comprising, in combination, an elongated upstanding relatively narrow casing, horizontal partitions in the casing forming a continuous zig-zag path from the upper end of the casing to the lower, reversing its direction alternately at opposite ends of the casing, means to introduce a fresh stream of heated air and seed cotton together with a stream of recirculated air into the upper end of said path to be discharged at the lower end thereof, means to separate a portion of the air together with the conditioned cotton at the lower end of said zig-zag path, and means located between the lower end of said zig-zag path and the upper end thereof to impart an impelling force to the remaining portion of the heated air and discharge it into the upper end of said zig-zag path to recirculate it therethrough.

References Cited in the file of this patent or the original patent

UNITED STATES PATENTS

| | | |
|---|---|---|
| 470,582 | Mellor et al. | Mar. 8, 1892 |
| 1,613,242 | Mitchell | Jan. 4, 1927 |
| 1,711,574 | Miller | May 7, 1929 |
| 2,123,405 | Court | July 12, 1938 |
| 2,132,656 | Smith | Oct. 11, 1938 |
| 2,143,505 | Arnold | Jan. 10, 1939 |
| 2,446,130 | Day | July 27, 1948 |
| 2,836,856 | Franks | June 3, 1958 |
| 2,898,635 | Vandergriff | Aug. 11, 1959 |
| 2,968,874 | Fishburn | Jan. 24, 1961 |